Patented Mar. 13, 1934

1,950,665

UNITED STATES PATENT OFFICE 1,950,665

MANUFACTURE OF CELLULOSE ESTER PRODUCTS

Henry Dreyfus, London, England

No Drawing. Original application November 24, 1928, Serial No. 321,751. Divided and this application November 18, 1930, Serial No. 496,574. In Great Britain December 17, 1927

4 Claims. (Cl. 18—57)

This invention is a divisional application from my application S. No. 321,751 and relates to the manufacture of new or improved artificial silks and the like, films, celluloid-substitutes or other thermoplastic masses, moulding powders and other industrial products from cellulose acetates or cellulose esters of higher homologues of acetic acid, for example, of propionic acid or butyric acid.

The said application describes the production of the esters which form the starting materials of the present invention from a variety of cellulosic materials including cotton and other forms of cellulose and near conversion products of cellulose, and also from already esterified or from etherified cellulose. The cellulosic materials are preferably pretreated prior to esterification so as to enhance their reactivity. This pretreatment may in the case of certain materials, for example wood pulps, comprise an initial alkaline purifying treatment followed by a pretreatment with formic acid or other suitable acid. In the case of other and purer materials, for example cotton, pretreatment may involve merely subjection of the materials to the action of formic acid or other organic acid under various conditions. The materials whether or not they have been pretreated are esterified, in solution or in suspension, in the presence of a stannic halide, e. g. stannic chloride or bromide. There may be present during esterification other halides, e. g. halides of iron, cobalt, nickel, manganese or copper, hydrochalide acids, e. g. hydrochloric acid, other esterification catalysts, and suitable diluents, e. g. benzene or solvents for the cellulose esters, e. g. acetic acid. In order to avoid degradation of the cellulose molecule the acetylation or other esterification is preferably carried out at temperatures not exceeding 50° C. The most valuable esters are obtained if the esterification is performed at low temperatures, for example below atmospheric e. g. 10° C. to 5° or 0° C. or lower, at ordinary temperatures or at temperatures, such as 20° to 30° C. not substantially above atmospheric.

The esterification may be performed in the presence of a solvent for the cellulose ester produced, e. g. acetic acid, and/or in the presence of liquid diluents, such, for example, as benzene or toluene. As a further modification, esterification may be conducted substantially in absence of liquid solvents or diluents, by employing vapours of acetic anhydride or other esterifying agents.

The cellulose acetates or other cellulose esters produced by the process of the said application have new and highly desirable properties. For example when they are subjected to ripening treatments it is found that they reach acetone-solubility with practically complete elimination of the catalysts when they still have an unusually high acidyl content, for example, on the order of 56% and higher calculated as acetic acid, and that filaments or other products spun from the acetates or other esters so produced are highly resistant to the delustering action of moist steam or other hot or boiling aqueous media.

These and other properties of the new cellulose acetates or other esters render them very valuable indeed for the production of artificial silks and the like, films, celluloid substitutes or other thermoplastic masses, moulding powders or moulded articles, etc. The present application has for its object the manufacture of industrial products from the said acetates or other esters.

The cellulose acetates or other cellulose esters resulting from the acetylation or other esterification may be used in their esterification solution or in solutions of the primary esterification products, or they may be subjected to secondary treatments or reactions as is described in the said application for the purpose of changing their solubilities. An important advantage of the present invention is the fact that the cellulose acetates or other esters can be so employed in their primary esterification solutions in their different stages or phases of acetylation or esterification.

Example I 100 parts of cotton cellulose are pretreated with formic acid, for example by treatment with 500 to 1000 parts or more of formic acid of about 85%–100% strength, allowing to stand for some hours in the cold and hydro-extracting or by impregnating with about 15 parts of formic acid of 75–85% strength and then allowing to stand for about 8–12 hours at ordinary temperature. If desired the material may then be washed with water, benzol or the like to remove the formic acid and centrifuged or dried. The 100 parts of pretreated material are introduced in the acetylator into a mixture of 600 parts of acetic anhydride, 600 parts of acetic acid, 10 parts of stannic chloride and 10 parts of hydrochloric acid, (calculated as HCl) either in the form of the fuming aqueous solution (35% strength) or in solution in the acetic acid, and the mass is constantly mixed or stirred during the reaction, which is conducted at about ordinary atmospheric temperature. The acetylation proceeds smoothly and a clear solution is obtained. The solution may either be used directly or the cellulose acetate may be precipitated and redissolved or worked up in any desired manner.

Example II 100 parts of cotton cellulose pretreated as in Example I are introduced in the acetylator into a mixture of 800 parts of acetic acid, 300 parts of acetic anhydride and 20 parts of stannic chloride. The reaction is carried out in the cold with constant mixing or stirring. A clear solution is obtained of a cellulose acetate of very high viscosity.

Example III 100 parts of cotton cellulose are introduced in the acetylator into about 800 parts of glacial acetic acid and the whole heated up to 80° C. and maintained at 80°–100° C. for about 12 hours. The contents of the acetylator are then cooled or allowed to cool to about 20° C. and 10 parts of stannic chloride and 10 parts of hydrochloric acid (calculated as HCl) either as 35% aqueous solution or in acetic acid solution are added, and finally 1500 parts of benzene mixed with 300 parts of acetic anhydride are introduced. The reaction is conducted at about 20° C.–40° C. with constant mixing or stirring of the mass.

Example IV 100 parts of cotton cellulose are introduced in the acetylator into a mixture of 800–1000 parts of acetic acid, 400 parts of acetic anhydride, 10 parts of stannic chloride, 10 parts of ferric chloride and 10 parts of hydrochloric acid (calculated as HCl) either in the form of aqueous solution (e. g. 35%) or in solution in the acetic acid, the reaction being then conducted in the cold with constant stirring or mixing. A solution is obtained of a cellulose acetate of high viscosity.

In a similar manner stannic bromide or stannic iodide may be used with or without halides of iron, cobalt, nickel, manganese or copper to effect the acetylation and furthermore by employing the appropriate anhydride or anhydrides other cellulose esters or mixed esters may be obtained. It is found that as compared with prior processes, the use of stannic halides as catalysts much facilitates the production of cellulose esters of higher fatty acids, e. g. propionic acid.

Further, the new cellulose esters of high quality may be dissolved in suitable solvents, for example acetone, ethyl alcohol-acetone, methyl alcohol-acetone, or the very low boiling solvents, for instance methyl formate, acetaldehyde and formaldehyde, or in mixtures of such solvents. Also suitable high boiling solvents or plasticising or softening agents can be readily incorporated with them or their solutions in volatile solvents and/or very low boiling solvents. For either wet or dry-spinning processes the esters may be employed in the form of solutions of relatively low concentration for instance 5–8% or of medium concentration for example 10–20%, or of high concentration containing over 20%, e. g. 25–30% or more.

The artificial silks and the like produced from the new secondary esters of high ester content are found to be much more resistant to delustring by hot or boiling aqueous liquids or moist steam than the cellulose ester products produced hitherto, and they may even resist delustring altogether.

As examples of suitable precipitating liquids for use in wet-spinning processes the following may be mentioned:—alcohols, for example methyl and ethyl alcohols and their homologues; coal tar, petroleum or other hydrocarbons, for instance benzene, toluene and their homologues, gasoline, kerosene and the like; and aqueous liquids containing, for example, suitable proportions of mineral acids, e. g. sulphuric acids, of acid salts, e. g. bisulphates, of neutral salts, e. g. sodium, potassium, calcium or magnesium chloride, or, as described in prior British specifications Nos. 177,868 and 179,234, of thiocyanates, zinc chloride, acetone, diacetone alcohol, alcohol, acetic acid, formic acid or other salts or substances having a latent solvent power for the cellulose acetate or other ester. Furthermore, such precipitating liquids may, if desired, be incorporated in suitable proportions in the spinning solutions prior to extrusion.

For the production of artifical silks or fibres, films, etc. as well as for the production of thermoplastic masses, articles and the like, plasticizing or softening agents or high boiling solvents may be incorporated in the esters or in their solutions.

What I claim and desire to secure by Letters Patent is:—

1. Articles having no substantial thickness comprising acetone-soluble cellulose acetate having an ester content, calculated as acetic acid, of at least 56% and which are inherently substantially resistant to the delustering action of hot aqueous media.

2. Artificial silk comprising acetone-soluble cellulose acetate which has an ester content calculated as acetic acid of at least 56% and which is inherently substantially resistant to the delustering action of hot aqueous media.

3. Dry-spun artificial silk comprising acetone-soluble cellulose acetate which has an ester content calculated as acetic acid of at least 56% and which is inherently substantially resistant to the delustering action of hot aqueous media.

4. Films comprising acetone-soluble cellulose acetate which has an ester content calculated as acetic acid of at least 56% and which are inherently substantially resistant to the delustering action of hot aqueous media.

HENRY DREYFUS.